United States Patent
Jones

[11] Patent Number: 5,806,763
[45] Date of Patent: Sep. 15, 1998

[54] THERMOSTAT FOR CONTROLLING RELATIVE HUMIDITY

[76] Inventor: Thaddeus M. Jones, 1302 High St., South Bend, Ind. 46601

[21] Appl. No.: 828,308

[22] Filed: Mar. 28, 1997

Related U.S. Application Data

[63] Continuation-in-part of Ser. No. 622,882, Mar. 29, 1996, abandoned.

[51] Int. Cl.$^6$ ................................................. G05D 22/02
[52] U.S. Cl. ........................................ 236/44 C; 237/2 A
[58] Field of Search ............................... 236/44 R, 44 A, 236/44 C, 44 E; 237/2 A; 374/28; 219/494, 510

[56] References Cited

U.S. PATENT DOCUMENTS

| | | | |
|---|---|---|---|
| 3,284,003 | 11/1966 | Ciemochowski | 236/44 A X |
| 4,105,063 | 8/1978 | Bergt | 236/44 C X |
| 4,799,621 | 1/1989 | Reith | 236/44 C X |
| 4,801,211 | 1/1989 | Yagi et al. | 236/44 E X |
| 5,346,129 | 9/1994 | Shah et al. | 236/44 C |

*Primary Examiner*—Harry B. Tanner
*Attorney, Agent, or Firm*—R. Tracy Crump

[57] ABSTRACT

A thermostat and method for controlling relative humidity is disclosed. The thermostat and method embodied therein controls a heater to maintain the ambient temperature a few degrees above a minimum temperature that is required to prevent condensation, frost and/or freezing. The thermostat controls heater operation from calculated saturation (dew point) temperature values derived from sensed relative humidity and ambient temperature values. The thermostat compensates for sensor non-linearity without the use of additional hardware circuitry or the use of memory intensive lookup tables. In addition, the thermostat of this invention adjusts for the inherent variances in electrical characteristics of the particular sensors used in thermostat circuitry. In one embodiment, the thermostat controls the operation of the heater to maintain the ambient temperature a few degrees above the calculated dew point. In a second embodiment, the thermostat maintains the ambient temperature a few degrees above the freezing point or the calculated dew point, whichever is the higher temperature.

6 Claims, 3 Drawing Sheets

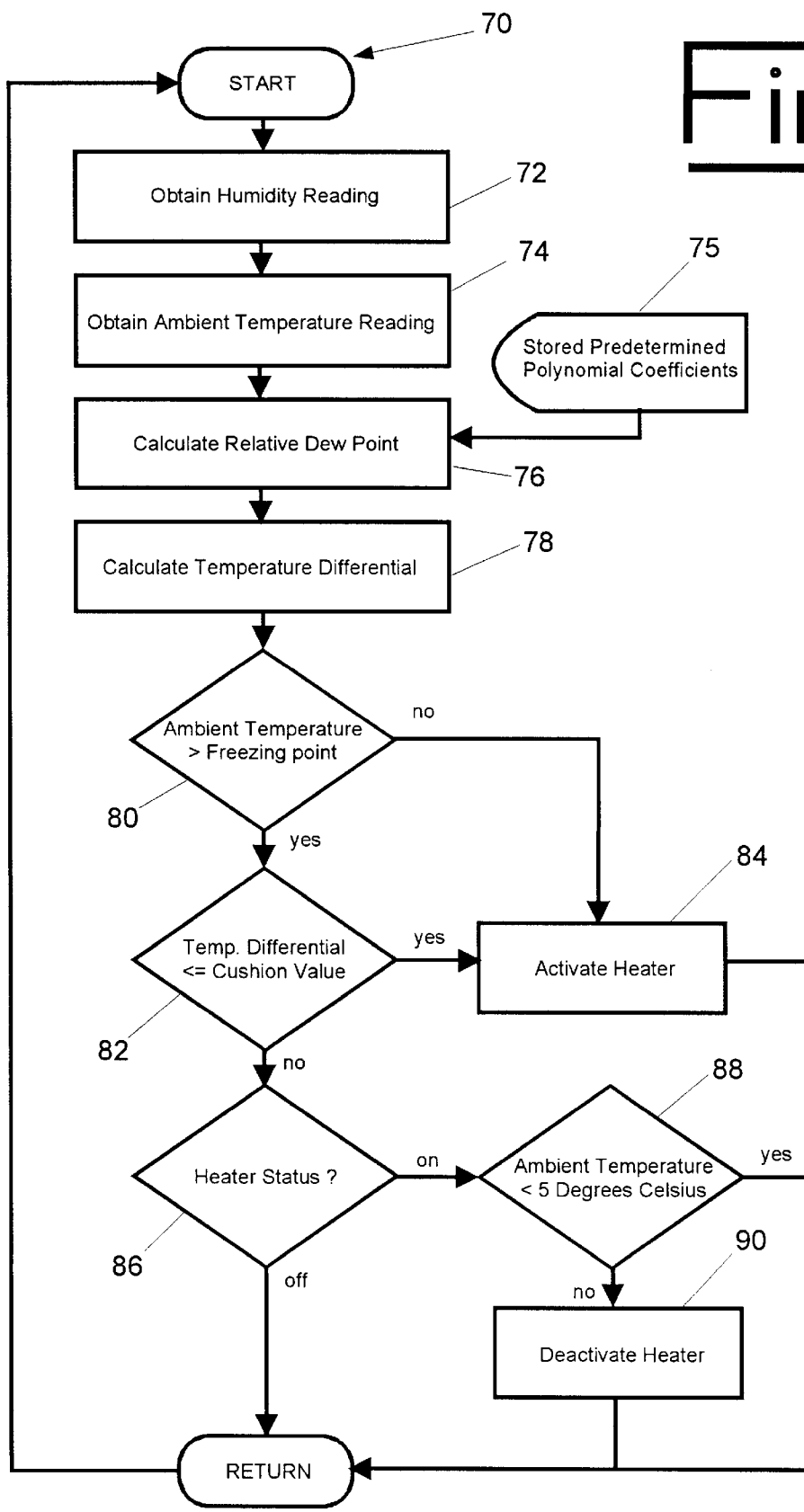

THERMOSTAT FOR CONTROLLING RELATIVE HUMIDITY

This is a continuation-in-part of application Ser. No. 08/622,882 filed on Mar. 29, 1996, abandoned.

This invention relates to a thermostat for controlling a heater to maintain the ambient temperature a few degrees above the dew, frost or freezing point, and in particular a thermostat which compensates for sensor non-linearity and variances without the use of additional hardware circuitry or the use of memory intensive lookup tables.

BACKGROUND OF INVENTION

Moisture condensation, frost formation and sub-freezing temperatures are a problem for many mechanical and electrical systems. Moisture condensation corrodes and damages device components and also supports molds, fungi, insects and vermin, whose presence can damage system components and wiring. The damage of moisture condensation is compounded by freezing.

In temperature control systems, which prevent freezing and condensation, electronic or electromechanical thermostats are used to control heater operation to maintain the ambient temperature above the freezing point or well above the highest anticipated dew point. In freeze protection systems, thermostats control heater operation to maintain an ambient temperature around 15° Celsius, which prevents freezing, and also condensation provided that the dew point is a few degrees below the ambient temperature. However, freeze protection thermostats will not prevent condensation when the dew point rises above its minimum temperature setting. Other thermostats, which are intended to prevent condensation across a wide temperature range and above the freezing point, are set to maintain the ambient temperature above the highest anticipated dew point (generally around 65° Celsius). While maintaining the ambient temperature above the highest anticipated dew point ensures that condensation will not occur, this method also ensures that the thermostat will provide excessive heating under virtually all conditions. Consequently, thermostats used in conventional freeze and condensation protection systems are inefficient in terms of energy consumption.

Heretofore, conventional electromechanical and electronic thermostats that operate over a wide temperature range must compensate for the non-linearity of the humidity sensors. A variety of hardware circuitry has been incorporated into thermostat design to compensate for sensor non-linearity. Adding hardware circuitry to compensate for the non-linearity of sensors significantly increases the cost and complexity to thermostat design. Compensating for the non-linearity of sensors has also been addressed in the software employed by conventional thermostat design. Typically, dew point is calculated from operational software which uses a lookup table topology. In lookup table topology, high order approximation expressions of saturated pressure as a function of temperature are stored as digital data in read-only memory (ROM) of memory integrated circuit chips or the internal ROM of microprocessors. This data forms a lookup table from which the microprocessor reads the appropriate value for every sensed temperature value in deriving the relevant humidity/dew point in the operation of the thermostat. The use of lookup table topology in thermostat design to compensate for non-linearity also has several practical drawbacks.

Inaccuracies are inherent in interpolating calculation of the humidity/dew point relation from stored data in a lookup table. The thermostat's accuracy is dependent on the number of data values stored in the lookup table for a particular temperature range. Consequently, the thermostat accuracy is limited by the amount of memory allocated for the lookup table data in the circuitry employed. Many conventional microprocessors have internal read only memory, but the amount of memory is relatively small, ranging from 512 bytes to approximately 16 kilobytes. Additional memory integrated circuit chips can be added to the circuitry to accommodate increased lookup table data, but this increases the cost and complexity of the circuitry.

Over a wide temperature range, thermostats must correct for both humidity and temperature. Typically, the electric characteristic of commercial humidity sensors vary with ambient temperature, independently of humidity. Consequently, the thermostat must compensate for both humidity and temperature variations. Using lookup table topology, this necessitates the use of a lookup table for each temperature point across a wide operative temperature range. Providing multiple lookup tables often means providing additional memory for data storage, beyond the internal memory available in microprocessor.

Consistency of thermostat performance is limited by the inherent variances in the characteristics of the particular sensors employed in the circuitry. Typically, commercial humidity and temperature sensors vary in accuracy tolerance from unit to unit. The variances between particular sensors can cause significant operational differences from thermostat to thermostat. Obviously, performance should be consistent between individual units. Heretofore, this requires the use of more precise and accurate sensors, which again increases the cost of the thermostat.

SUMMARY OF THE INVENTION

The thermostat and the method embodied therein of this invention controls a heater to maintain the ambient temperature a few degrees above a minimum temperature, which is required to prevent condensation and/or freezing. Consequently, the thermostat prevents excessive heating and minimizes the energy consumed in condensation and freeze protection systems. The thermostat controls heater operation from calculated saturation (dew point) temperature values derived from sensed relative humidity and ambient temperature values. The thermostat compensates for sensor non-linearity without the use of additional hardware circuitry or the use of multiple lookup tables—one for each ambient temperature value. In addition, the thermostat of this invention compensates for the inherent variances in electrical characteristics of the particular sensors used in thermostat circuitry. In one embodiment, the thermostat controls the operation of the heater to maintain the ambient temperature a few degrees above the calculated dew point. In a second embodiment, the thermostat maintains the ambient temperature a few degrees above the freezing point or the calculated dew point, whichever is the higher temperature.

The thermostat of this invention is electrically connected to a convention relay contactor, to allow selective actuation of the heater. The thermostat includes a humidity sensor, a temperature sensor, an analog-to-digital (AD) converter, a field effect transistor and a microprocessor. The humidity sensor converts a measured value of the relative humidity into a proportional variance in an electrical parameter. The temperature sensor converts a measured value of the ambient temperature into a proportional variance in an electrical parameter. The AD converter digitizes the electrical signals from humidity and temperature sensors for input to the microprocessor. One output terminal of the microprocessor is connected to the gate of the transistor. The transistor provides a voltage switch to the contactor controlling the heating system. The microprocessor executes a software program stored in its memory, which controls the operation of the thermostat. The output signal generated by the microprocessor is determined by the logic and computational functions of the control program. When the output signal from the microprocessor is high, the transistor sinks current to energize the contactor, which supplies voltage to the heater. When the output signal from the microprocessor is low, the transistor blocks current to de-energize the relay contactor, which removes voltage from the heater. One embodiment of the control program executed by the microprocessor enables the thermostat to maintain the ambient temperature at least three to five degrees above the dew point. A second embodiment of the control program prevents the ambient temperature from dropping below the freezing point independent of the difference between the calculated dew/frost point and the ambient temperature.

The operational software, which controls the operation of this thermostat, calculates the dew point temperature value by fitting a polynomial power series equation to the encoded values. The basic polynomial power series equation is $e(t)=A_0+A_1(t-t_0)+A_2(t-t_0)^2+A_3(t-t_0)^3+A_4(t-t_0)^4+\ldots$ The dew point temperature value is determined by expanding the polynomial in powers of the ambient temperature using either fixed point or floating point arithmetic. Typically, a fifth order polynomial provides adequate precision. Using this method of deriving the humidity/dew point relation, only the coefficient of the polynomial power series need be stored in the processors's memory. Calculating the dew point value by expanding the polynomial in power of the ambient temperature eliminates the need for stored lookup tables. It also eliminates the need to compensate for non-linearity in the hardware or software. Non-linearity and variance inherent in the sensors are compensated for by adjusting the values of the coefficients programmed into the microprocessor. Before programming the microprocessor, the humidity sensor and its interface circuitry are tested in a test set under set environmental conditions to identify the unique electrical characteristics of the humidity sensors employed therein, whereupon the appropriate coefficient values of the polynomial can be determined. Once the coefficient values are determined for a particular humidity sensor, they can be programmed into the microprocessor. Very little memory is required to store the coefficient values compared to the memory required to store a full lookup table. Furthermore, the accuracy and operational consistence is improved by compensating for variance in individual sensors.

Accordingly, an advantage of this invention is that the thermostat design eliminates the need for additional hardware to compensate for humidity sensor non-linearity over wide temperature ranges.

Another advantage of this invention is that the thermostat compensates for inherent variance in the individual sensors employed in the thermostat circuitry.

Another advantage of this invention is that the thermostat operates the heater only when required to maintain the ambient temperature a few degrees above the minimum temperature that is required to prevent condensation and/or freezing, which minimizes energy consumption.

Another advantage of this invention is that the thermostat continuously monitors the ambient temperature and relative humidity, which enables the thermostat to efficiently operate the heater during changing environmental conditions.

Another advantage of the thermostat of this invention is that the thermostat can operate the heater to maintain the ambient temperature above the freezing point even if the dew point falls below freezing.

Other advantages will become apparent upon a reading of the following description.

BRIEF DESCRIPTION OF THE DRAWINGS

The preferred embodiments of the invention have been depicted for illustrative purposes only wherein:

FIG. 3 is a flow chart of one embodiment of the program which controls the operation of the thermostat of this invention.

DESCRIPTION OF THE PREFERRED EMBODIMENT

The preferred embodiments herein described are not intended to be exhaustive or to limit the invention to the precise form disclosed. They are chosen and described to explain the invention so that others skilled in the art might utilize its teachings.

Figure 1:
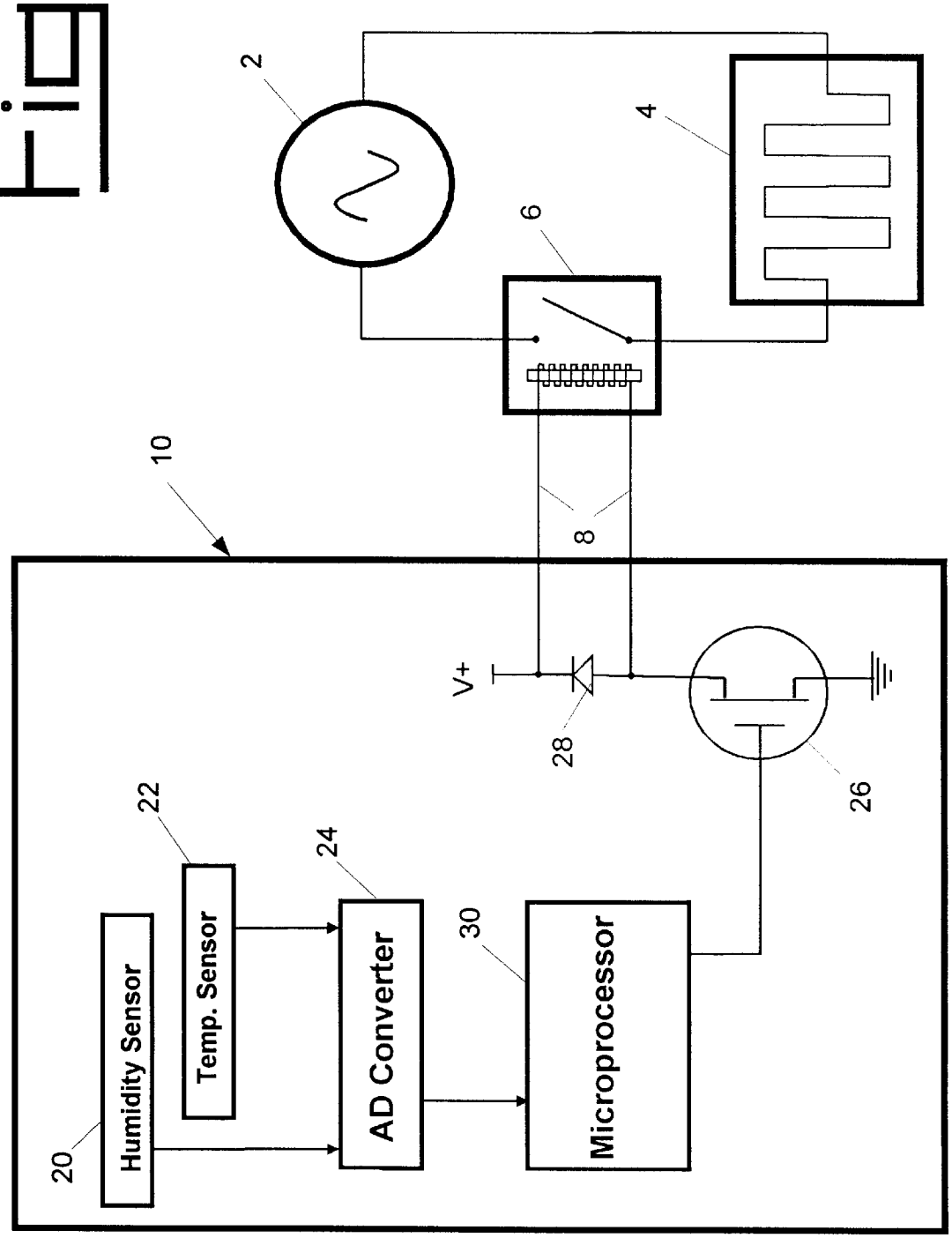
FIG. 1 is a simplified schematic drawing of the thermostat of this invention used in a typical electrical heating system.

FIG. 1 shows thermostat 10 of this invention in a typical heating system. As shown, line voltage source 2 is connected to an electrical heater 4 through a contactor 6 or other suitable switching device. Thermostat 10 controls the operation of the heater by actuating contactor 6 to control the voltage supply to heater 4. Thermostat 10 is connected to contactor 6 by control lines 8.

Preferably, the circuitry of thermostat 10 is powered from a low voltage power source 2, although any suitable power source may be used. Thermostat 10 includes a humidity sensor or transducer 20, a temperature sensor or transducer 22, an analog-to-digital (AD) converter 24, a field effect transistor 26 and a microprocessor 30. Humidity sensor 20 converts a measured value of the relative humidity into a proportional electrical signal and is electrically connected to a conventional humidity sensor (not shown). Temperature sensor 22 converts a measured value of the ambient temperature into a proportional electrical signal. Humidity and temperature sensors, microprocessors, converters and transistors are well known in the electrical arts and suitable sensors for the purposes employed in this thermostat are commercially available from a variety of sources.

The outputs from sensors 20 and 22 are connected to the inputs of AD converter 24. AD converter 24 digitizes the electrical signals from sensors 20 and 22 for input to microprocessor 30. An output of the AD converter 24 is connected to an input terminal of microprocessor 30. The output terminal of microprocessor 30 is connected to the gate 27 of transistor 26. Preferably, transistor 26 is an n-channel enhancement mode metal oxide filed effect transistor. As shown, contactors 6 are connected in series with the drain of transistor 26. Transistor 26 provides a voltage switch to the coil of contactor 6. Preferably, a diode 28 is connected in parallel to relay contactors 6. Diode 28 prevents a voltage surge from damaging the circuitry of thermostat 10 as relay contactor 6 de-energizes by insuring that the coil current of contactor 6 is continuous at the instant of de-energization.

Preferably, microprocessor 30 has sufficient internal electrical erasable programmable read-only memory (EEPROM) that is one time programmable for use in storing the control program, i.e., the software program which controls the operation of thermostat 10. Two embodiments of the control program 50 and 70 are described in greater detail below. Once power is applied to thermostat 10, microprocessor 30 initializes itself and begins the continuous execution of the control program stored in its memory. Microprocessor 30 executes the control program in an infinite loop. The output signal generated by microprocessor 30 is determined by the logic and computational functions of the control program. When the output signal from microprocessor 30 is high, transistor 26 sinks current to energize contactor 6, which supplies voltage to heater 4. When the output signal from microprocessor 30 is low, transistor 26 blocks current to de-energize contactor 6, which removes power from heater 4.

Both embodiments of the control program 50 and 70 contains the processor instructions for calculating the saturation temperature (dew point) value from the sensed relative humidity and ambient temperature from sensors 20 and 22. The calculations are generated by fitting a polynomial power series equation to the encoded values. The basic polynomial power series equation is $e(t)=A_0+A_1(t-t_0)+A_2(t-t_0)^2+A_3(t-t_0)^3+A_4(t-t_0)^4+\ldots$. The dew point value is determined by expanding the polynomial in powers of the ambient temperature using either fixed point or floating point arithmetic. Typically, a fifth order polynomial provides adequate precision. The coefficient values of the polynomial ($A_0$, $A_1$, $A_2$, ...) are also stored as digital data in the memory of microprocessor 30 along with the control program. Only a few bytes of memory are required to store the coefficient values as compared to the several hundred bytes required to store the digital data of a typical lookup table.

For each individual thermostat, the values of the coefficients programmed into the microprocessor can be adjusted to correct for variance in the tolerance of humidity sensors 20. Before programming, humidity sensor 20 and its interface circuitry are tested in a test set under set environmental conditions to identify their unique electrical characteristics, whereupon the appropriate coefficient values of the polynomial can be determined. Preferably, the circuit is tested in a saturated metal salt solutions, such as sodium chloride, which has precise humidity at given ambient temperatures. The electrical characteristics of the individual humidity sensors 20 can be derived from the electrical parameters obtained from the test results at various temperature and humidity levels. Next, the appropriate coefficient values for the polynomial can be calculated. Once the coefficient values are determined for a particular humidity sensor 20, they can be programmed into the memory of microprocessor 30. The coefficient values stored in the memory of microprocessor 30 are illustrated in FIG. 2 as data block 55 and in FIG. 3 as data block 75.

Figure 2:
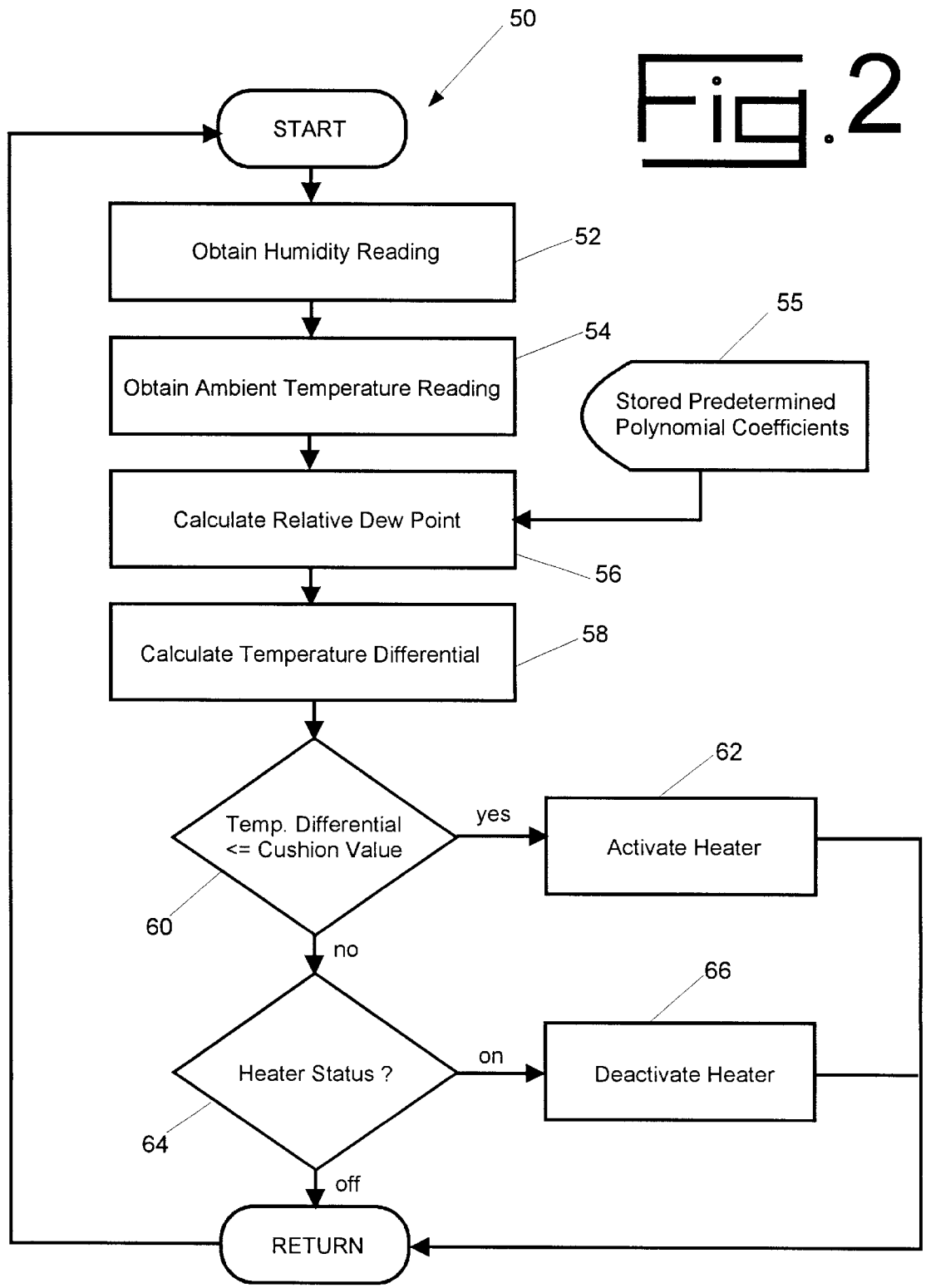
FIG. 2 is a flow chart of one embodiment of the program which controls the operation of the thermostat of this invention.

FIG. 2 shows the flow chart of one embodiment of the control program 50 executed by microprocessor 30. In the first embodiment, the control program enables the thermostat to control heater 4 to maintain the ambient temperature at least three to five degrees above the dew point. Program 50 begins by instructing microprocessor 30 to obtain a binary reading of the relative humidity from A-D converter 24 (process block 52). A-D converter 24 inputs the proportional electrical signal from humidity sensor 20 and outputs the binary humidity value to the input terminal of microprocessor 30. Microprocessor 30 stores the binary humidity value in a memory register. Next, program 50 instructs microprocessor 30 to obtain a binary reading of the ambient temperature from A-D converter 24 (process block 54). A-D converter 24 inputs the proportional electrical signal from temperature sensor 22 and outputs the binary reading to an input terminal of microprocessor 30. Microprocessor 30 stores the binary temperature reading in a second memory register. One skilled in the electrical arts will note that linearization may be required to produce a reading linearly proportional in value to the actual reading of moisture and temperature, depending on the type of sensors used. One commonly used means of linearization is to use sequential memory locations to store encoded reading values in a look up table. Each memory location or cell represents the memory address containing a corrected value.

Next, program 50 instructs microprocessor 30 to calculate the dew point value (calculation block 56) from the stored binary readings of relative humidity (processor block 52) and ambient temperature (processor block 54) along with the coefficient values stored in the memory of microprocessor 30 (data block 55).

Once the dew point value is calculated, program 50 instructs microprocessor 30 to calculate the difference between the calculated dew point value and the ambient temperature value (calculation block 58). Next, program 50 instructs microprocessor 30 to compare the difference between the dew point value and the ambient temperature value to a set temperature cushion value (logic block 60). The set temperature cushion value to which the temperature differential is compared corresponds approximately to an actual temperature range of 3°–5° C. If the temperature differential is equal to or less than the temperature cushion value, program 50 instructs microprocessor 30 to generate a high output signal, which activates heater 4 (process block 62). If the temperature differential is greater than the set value, program 50 instructs microprocessor 30 to determine if heater 4 is on or off (logic block 64). Generally, the state of the microprocessor's output signal is used to indicate the status of the heater. If heater 4 is not operating, i.e. the output signal from microprocessor 30 is low, program 50 instructs microprocessor 30 to maintain the current state of its output signal. If heater 4 is operating, i.e., the output signal from microprocessor 30 is high, program 50 instructs microprocessor 30 to generate a low output signal, which deactivates heater 6 (processor block 66).

FIG. 3 shows a flow chart of a second embodiment of the control program executed by microprocessor 30. The second embodiment of the program is similar to the first embodiment, except that the program enables the thermostat to control the heater to prevent the ambient temperature from dropping below either the freezing point or the calculated dew point. Program 70 begins by instructing microprocessor 30 to obtain a binary reading of the relative humidity from A-D converter 24 (process block 72). A-D converter 24 inputs the linearly proportional electrical signal from humidity sensor 20 and outputs the binary humidity value to the input terminal of microprocessor 30. Microprocessor 30 stores the binary humidity value in a memory register. Next, program 70 instructs microprocessor 30 to obtain a binary reading of the ambient temperature from A-D converter 24 (process block 74). A-D converter 24 inputs the linearly proportional electrical signal from temperature sensor 22 and outputs the binary reading to the input terminal of microprocessor 30. Microprocessor 30 stores the binary temperature reading in a second memory register.

Next, program 70 instructs microprocessor 30 to calculate the dew point value (calculation block 76) from the stored binary readings of relative humidity (processor block 72) and ambient temperature (processor block 74) along with the coefficient values stored in the memory of microprocessor 30 (data block 75). Once the dew point value is calculated, program 70 instructs microprocessor 30 to calculate the difference between the calculated dew point value and the ambient temperature value (calculation block 78). Next, program 70 instructs microprocessor 30 to compare the ambient temperature value against a freezing point temperature value corresponding to zero degrees Celsius (logic block 80). If the ambient temperature value is less than or equal to the freezing point temperature value, program 70 instructs microprocessor 30 to generate a high output signal, which activates heater 4 (process block 82).

Next, program 70 instructs microprocessor 30 to compare the temperature differential between the dew point value and the ambient temperature value to a set temperature cushion value (logic block 84). The set temperature cushion value corresponds approximately to an actual temperature range of 3°–5° C. If the temperature differential is equal to or less than the temperature cushion value, program 50 instructs microprocessor 30 to generate a high output signal, which activates heater 4 (process block 82). If the temperature differential is greater than the temperature cushion value, program 70 instructs microprocessor 30 to determine if heater 4 is on or off (logic block 86). If heater 4 is not operating, i.e. the output signal from microprocessor 30 is low, program 70 instructs microprocessor 30 to maintain the current state of its output signal. If heater 4 is operating, i.e. the output signal from microprocessor 30 is high, program 70 instructs microprocessor 30 to compare the ambient temperature value to a shutdown temperature value corresponding to approximately 5° Celsius (logic block 88). If the ambient temperature value is less than the shutdown temperature value, program 70 instructs microprocessor 30 to maintain the state of its output signal. If the ambient temperature value is greater than the shutdown temperature value, program 70 instructs microprocessor 30 to generate a low output signal, which deactivates heater 4 (processor block 90).

It is understood that the above description does not limit the invention to the details given, but may be modified within the scope of the following claims.

I claim:

1. An electrical thermostat for controlling the operation of a heater to prevent moisture condensation comprising:

a humidity sensor means for generating a first electrical signal proportional to the relative humidity, a temperature sensor means for generating a second electrical signal proportional to the ambient temperature, analog-to-digital converter means connected to said humidity sensor means and said temperature sensor means for digitizing said first electrical signal into a binary humidity value and for digitizing said second electrical signal into a binary ambient temperature value, processing means coupled to said converter means for calculating a linearized dew point value from said humidity value and said ambient temperature value by expanding a polynomial series in powers of said ambient temperature value using predetermined coefficient values, said coefficient values being calculated from the predetermined electrical characteristics of said humidity sensor means to eliminate inherent variances in said humidity sensor means and to linearize said first electrical signal from said humidity sensor means independent of ambient temperature, said processing means also for actuating said heater in response to a predetermined relationship between said calculated dew point value and said ambient temperature value, and memory means coupled to said processing means for storing said coefficient values.

2. The thermostat of claim 1 wherein said processor means generates an output signal to operate said heater when said ambient temperature value is within a predetermined value of said calculated dew point value.

3. The thermostat of claim 1 wherein said processor also generates an output signal to operate said heater when said ambient temperature value is within a predetermined value of the freezing point.

4. In an electrical thermostat for controlling a heater to prevent condensation including a humidity sensor means, a temperature sensor means, an analog to digital converter, and a microprocessor having internal memory, an improved method for determining dew point, said method comprising in combination the steps of:

a) generating a first electrical signal proportional to the relative humidity from said humidity sensor means, b) generating a second electrical signal proportional to the ambient temperature from said temperature sensor means, c) converting said first electrical signal into a binary humidity value and said second electrical signal into a binary ambient temperature value, d) storing predetermined coefficient values of a polynomial in said memory, said coefficient values having been calculated from the predetermined electrical characteristics of said humidity sensor means to eliminate inherent variances in said humidity sensor means and to linearize said first electrical signal from said humidity sensor means independently of ambient temperature, e) calculating using said microprocessor a linearized dew point value from said humidity value and said ambient temperature value by expanding said polynomial series in powers of said ambient temperature value using said predetermined coefficient values, f) generating an output signal to operate said heater in response to a predetermined relationship between said calculated dew point value and said ambient temperature value.

5. The method of claim 4 wherein said step f) includes generating an output signal to operate said heater when said ambient temperature value is within a predetermined value of said calculated dew point value.

6. The method of claim 5 wherein said step f) also includes generating an output signal to operate said heater when said ambient temperature value is within a predetermined value of the freezing point.

* * * * *